United States Patent [19]

Smith

[11] 4,207,302
[45] Jun. 10, 1980

[54] METHOD OF TREATING PHOSPHORIC ACID TO PREVENT CRUD FORMATION DURING SOLVENT EXTRACTION

[75] Inventor: Jay C. Smith, Gonzales, La.
[73] Assignee: Freeport Minerals Company, New York, N.Y.
[21] Appl. No.: 656,981
[22] Filed: Feb. 10, 1976

Related U.S. Application Data

[63] Continuation-in-part of Ser. No. 489,590, Jul. 18, 1974, abandoned.
[51] Int. Cl.² .............................................. C01B 25/18
[52] U.S. Cl. ............................. 423/321 S; 423/321 R; 423/319; 423/658.5; 423/8
[58] Field of Search ............ 423/319, 320, 321, 321 S, 423/8, 10

[56] References Cited

U.S. PATENT DOCUMENTS 3,619,161  11/1971  Knarr et al. ........................ 423/321 S
3,867,511  2/1975  Chiang et al. ..................... 423/321 S

OTHER PUBLICATIONS

Ind. Eng. Chem. Proc. Des. & Dev.-Recovery of Uranium from Wet Process Phosphoric Acid-Hurst et al., vol. 11#1, pp. 122-128.
Organic Chemistry-Morrison & Boyd, pp. 27-28-1966.
Phosphoric Acid-Slack-1968-pp. 665-668.

*Primary Examiner*—Herbert T. Carter
*Attorney, Agent, or Firm*—Ronald A. Schapira

[57] ABSTRACT

A method for pretreating phosphoric acid to prevent the formation of a mass of suspended solids (i.e., "crud") during solvent extraction of the acid is described. Prior to solvent extraction, the acid is contacted with a liquid hydrocarbon such as kerosene which collects the crud-forming agents. The mixture of liquid hydrocarbon and collected crud-forming agents is separated from the acid and the liquid hydrocarbon is regenerated for reuse in the first step of the method.

21 Claims, 2 Drawing Figures

METHOD OF TREATING PHOSPHORIC ACID TO PREVENT CRUD FORMATION DURING SOLVENT EXTRACTION

CROSS REFERENCE TO RELATED APPLICATIONS

This is a continuation-in-part of application Ser. No. 489,590, filed July 18, 1974 now abandoned.

BACKGROUND OF THE INVENTION

Wet process phosphoric acid is produced by the acidulation of phosphate rock with sulfuric acid. Calcium sulfate precipitates in this reaction, usually as gypsum, and is separated by filtration or other suitable means from the resulting phosphoric acid which is usually about 30% $P_2O_5$ in strength. The acid may next be concentrated by evaporation or any other suitable means to a 54-60% $P_2O_5$ merchant grade product or, sometimes, to a lower strength for use, for example, in the manufacture of a fertilizer such as diammonium phosphate. Phosphoric acid in medium strength is also frequently found at various intermediate stages in the manufacture of the acid by the wet process.

The phosphate rock which is acidulated almost always contains numerous natural impurities which dissolve in the sulfuric acid or which otherwise pass through the gypsum filters with the phosphoric acid as suspended fines. Among these nautral impurities are siliceous materials such as $SiO_2$, iron and aluminum compounds such as clays, alkali metal compounds, magnesium compounds, fluorides, uranium and rare earths, as well as some carbonaceous matter such as humic materials and highly condensed organics of marine origin. In addition to these natural impurities, the weak 30% phosphoric acid separated from the gypsum also often contains impurities which originate from organic substances such as fatty acids, fatty acid derivatives, tallow amines and hydrocarbon oils that are added during the beneficiation and acidulation of the phosphate rock. Finally, excess sulfuric acid is normally used in acidulating the rock and this leads to the presence of substantial amounts of sulfates in the 30% phosphoric acid.

While the impurities in wet process phosphoric acid are generally regarded as contaminants which detract from quality and appearance and often interfere with the subsequent processing of the acid, some are considered potential sources of by-product recovery. Various solvent extraction processes have therefore been developed for extracting the impurities or potential by-products from phosphoric acid or, in some cases, for extracting the phosphoric acid from the impurities or potential by-products. Examples of such solvent extraction processes are described in U.S. Pat. Nos. 3,737,513 and 3,711,591 (recovery of by-product uranium), No. 3,700,413 and No. 3,437,454 (recovery of by-product vanadium), No. 3,458,282 (removal of fluorine or anionic sulfate), and No. 3,694,153 (removal of iron and alkaline earth metals).

In the typical solvent extraction process, a water insoluble organic extractant phase containing an active complexing agent is mixed with the phosphoric acid. The impurities or potential by-products are transferred to (extracted into) the extractant phase and the pregnant extractant is separated from the acid in a settler or other suitable equipment. Alternatively, the phosphoric acid is transferred to (extracted into) the extractant phase and the acid-pregnant extractant is separated from the raffinate containing the impurities or by-products, again in a settler or other suitable equipment. Usually, multiple countercurrent mixer-settler stages are employed for this operation, and the loaded organic extractant is subsequently treated in some manner to separate the extractant component and regenerate a "lean organic" for reuse in extraction of the acid. The organic extractant phase may include liquid hydrocarbons, similar to those employed in the present invention, which are used as diluents, or carriers, of the complexing agents used as extracting ingredients, but it will be understood that the present invention differs from these solvent extraction processes in that the present invention does not require an active complexing agent and in that the present invention involves physical removal of substances which are visibly distinguishable from, and substantially insoluble in, the hydrocarbons with which they are removed; whereas the solvent extraction processes require an active complexing agent and involve the extraction, or dissolution, of substances which are then dissolved in the solvent and are not visibly distinguishable from the solvent with which they are extracted.

It has been recognized that phosphoric acid should be subjected to a clarification operation prior to extraction as described above. Among the reasons for this are that a high concentration of solids in the phosphoric acid feed tends to decrease the operating efficiency of the equipment which is used to carry out the extraction and that the presence of solids in increased quantities leads to increased extractant losses, since the extractants tend to adhere to the solid particles and leave with the aqueous phase, thereby becoming unavailable for extraction. In addition, the presence of solids in the acid has generally been associated with the formation of an interfacial layer (generally referred to by those skilled in the art as "crud") during extraction, which in turn results in a more difficult separation of phases during the extraction operation, which can clog or otherwise interfere with the operation of the extraction equipment, and which may deposit on the surface of the extraction equipment, adding to the problems of cleaning, maintenance, etc. It has been recognized that to some extent the degree of crud formation is related to the degree of clarification of the acid prior to extraction and that well-clarified acids normally produce less crud during extraction than acids which have high solids contents. However, even with a well-clarified phosphoric acid, crud formation still occurs along the extractant-acid interface and this creates the above-mentioned problems of separation of phases, extractant losses, and removal and disposal of the crud.

The formation and actual composition of the material referred to herein as crud is not completely known. The material appears to be made up mainly of solid compounds which come into the system as impurities with the phosphate rock or as additives during beneficiation and acidulation of the rock. These compounds are generally referred to by those skilled in the art and in this disclosure as crud-forming agents. They include:

1. Siliceous materials, such as $SiO_2$, $Na_2SiF_6$, and $K_2SiF_6$.

2. Iron and aluminum compounds, such as $AlF_3$, and a number of clays, such as $(Mg.Ca)O.Al_2O_3.4SiO_2.nH_2O$ (where n=2, 3, 4, etc.) and $Al_2O_3.2SiO_2.2H_2O$.

3. Sulfates, from the reaction of the $H_2SO_4$ with various cations, such as $CaSO_4$, $CaSO_4.2H_2O$, and $MgSO_4$.

4. Fine carbonaceous solids, usually black, which apparently come from the phosphate rock, and which are virtually insoluble in liquid hydrocarbons. These are usually found almost completely incorporated into the crud. Examples are humic materials, such as humic acid which is a material often found in dirt; highly condensed organics of marine origin, which are similar to the humic materials; and the like.

5. Fatty acids, which may have been introduced during beneficiation. Fatty acids of the type used in beneficiation have the general formula R—COOH, where R is a high molecular weight alkyl radical usually having at least about 10 carbons. Examples include palmitic acid, $CH_3(CH_2)_{14}COOH$ and stearic acid, $CH_3(CH_2)_{16}COOH$.

6. Tallow amines, which may have been introduced during beneficiation. Tallow amines are primary amines derived from tallow fatty acids. They are high molecular weight aliphatic amines produced from mixtures of fatty acids. Normally they are mixtures of amines of the type represented as $R-CH_2-NH_2$, where R is a radical of more than 10 carbons and the total number of carbons is usually even.

7. Fatty acid derivatives, which may come from the use of defoamers during acidulation. Fatty acid derivatives used in defoamers usually include esters of the type represented as $R-COO-R_1$, where both R and $R_1$ are high molecular weight alkyl radicals, each having at least about 10 carbons. Examples are waxes such as $C_{23}H_{49}COOC_{26}H_{53}$ and $C_{27}H_{55}COOC_{26}H_{53}$.

8. Any other organic and inorganic compounds present in the phosphate rock, such as fluorides (e.g., $MgF_2$, $CaF_2$, and NaF), alkali earth metal compounds (e.g., $Na_2SiF_6$ and KF), and alkaline earth metal compounds (e.g., $MgF_2$ and $CaF_2$). The proportion of each of these crud-forming agents varies from acid to acid, depending on such factors as the source and nature of the phosphate rock used to make the acid. In some acids the the siliceous ($SiO_2$-like) materials may comprise as much as 80% or more of the crud-forming agents, while in other acids the aluminum and iron compounds may constitute most of it. In still other acids, the carbonaceous matter may make up as much as 50 or 60 percent of the crud-forming agents. Whatever the make-up and composition of the crud-forming agents, they are all substantially insoluble in the liquid hydrocarbons used in accordance with this invention. They also have the common property that they are not dissolved, or extracted, by the solvent extractants used in solvent extraction processes. Rather, they tend to accumulate in the interface during solvent extraction and cause the problems and inconveniences mentioned above. The materials which form the crud appear to do so by encapsulating droplets of extractant or otherwise thickening the extractant. Typically, the extractant becomes a thick mass when contaminated with as little as 1% of the crud-forming materials, that is, one pound of these materials may tie up about 100 pounds, or more, of extractant, which then become unavailable for extraction of the acid.

In some cases, the amount of crud formed appears to be related to the strength of the acid being processed. Thus at concentrations below about 40% $P_2O_5$, phosphoric acid can be clarified to very low solids contents by settling. A high molecular weight anionic flocculant is often used to aid in the removal of the fines by settling techniques. Low strength acids, e.g., 30% $P_2O_5$, which have settled for several days generally do not form excessive amounts of crud. On the other hand, high strength acids, e.g., 60% $P_2O_5$, are usually more difficult to settle and generally form more crud. In any event, it is often not economically feasible to provide several days of settling in commercial installations, nor is it always desirable to carry out the solvent extraction at low acid strengths. Thus the problems of maintenance of extraction equipment, removal, handling and disposal of crud, expenses associated with crud formation extractant losses, and the problems of producing ultraclear acid feed stocks are often of sufficient magnitude to make any of the proposed phosphoric acid solvent extraction processes commercially unattractive.

It is therefore an object of this invention to avoid or substantially reduce the formation of crud during solvent extraction of wet process phosphoric acid.

It is another object of this invention to provide a method for treating wet process phosphoric acid to substantially remove crud-forming agents from the acid prior to solvent extraction of the acid.

It is yet another object of this invention to provide a method for treating wet process phosphoric acid so that no crud, or at least substantially less crud, forms when the acid is subsequently subjected to solvent extraction.

SUMMARY OF THE INVENTION

These and other objects of the invention are accomplished in accordance with the principles of the invention by mixing the phosphoric acid with a liquid hydrocarbon prior to solvent extraction. As used herein and in the appended claims, the term "liquid hydrocarbon" means a liquid consisting essentially of a hydrocarbon or chlorinated hydrocarbon or mixtures thereof. Examples of suitable liquid hydrocarbons are kerosene and chlorohexane. The liquid hydrocarbon collects the crud-forming agents from the phosphoric acid and is then separated from the phosphoric acid, carrying with it the crud-forming agents. It has been found that the phosphoric acid thereby separated from the liquid hydrocarbon and crud-forming agents does not generate any crud, or at most generates very little crud, during the subsequent solvent extraction operation. The liquid hydrocarbon is regenerated for reuse in removing crud-forming agents with an aqueous base to transfer the crud-forming agents to the aqueous base and then separating the liquid hydrocarbon from the aqueous base and crud-forming agents.

The method of this invention is not intended to remove coarse crystalline solids which are also associated with solvent losses during the extraction operation. Accordingly, in many cases a conventional clarification operation may be used in conjunction with the method of this invention to remove those coarse solids. However, the method of this invention does appear to decrease the degree of clarification needed prior to extraction in order to meet any specified maximum amount of crud formation and solvent losses which can be tolerated during extraction. How large this contribution is will depend on such considerations as the type of clarification equipment used, the strength of the acid being processed, and the type of extraction operation being carried out. In any event, when the method of this invention is used, a higher concentration of solids in the acid prior to extraction can generally be tolerated without adversely affecting the formation of crud during solvent extraction. This means that less clarification will generally be needed than when the method of this invention is not used.

DETAILED DESCRIPTION OF THE INVENTION

Figure 1:
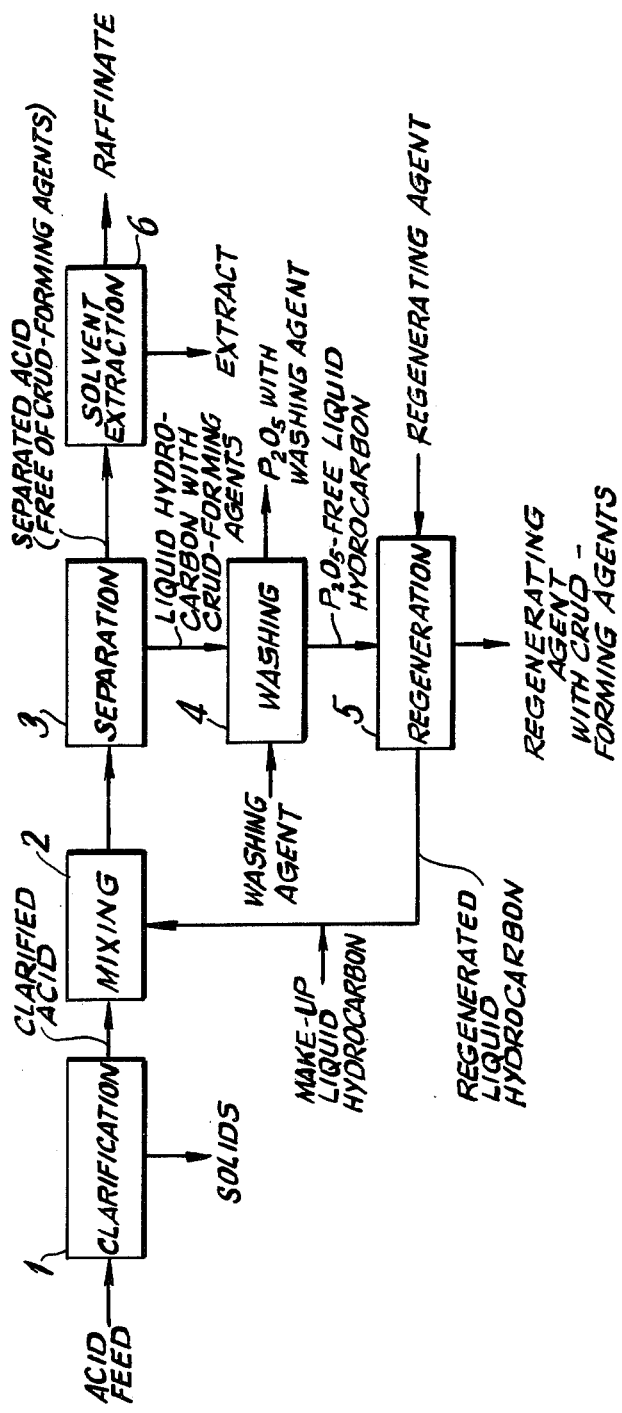
FIG. 1 is a block diagram showing several steps often found in the processing of wet process phosphoric acid, including the steps of the method of this invention.

As mentioned briefly above, FIG. 1 shows several steps often found in the processing of wet process phosphoric acid, including the steps of the method of this invention. The steps shown in FIG. 1 are as follows (with the numbers below corresponding to the reference numbers shown in the drawing):

1. Clarification of the phosphoric acid feed.
2. Mixing of the clarified phosphoric acid with a liquid hydrocarbon. As mentioned above, the term "liquid hydrocarbon" as used herein and in the appended claims means a liquid consisting essentially of a hydrocarbon or chlorinated hydrocarbon or mixtures thereof.
3. Separation of the liquid hydrocarbon and crud-forming agents from the phosphoric acid.
4. Washing of the separated mixture of liquid hydrocarbon and crud-forming agents.
5. Regeneration and recycling of the liquid hydrocarbon.
6. Solvent extraction of the separated phosphoric acid.

In step 1 above, wet process phosphoric acid typically having a $P_2O_5$ concentration between about 20 and 60% and preferably between 28 and 44%, is first clarified in any conventional manner (e.g., in a settling tank with the aid of a flocculant) to a solids content of less than about 0.5%, and preferably less than about 0.3%, by volume as determined by centrifuging a sample of the acid at an acceleration of about 15,000 ft/sec$^2$. Acid concentrations below about 20% $P_2O_5$ are rarely if ever employed in commercial operations, and in any event, acids of such low concentrations generally form very little crud and the method of this invention is usually not needed in processing them, although it could be used. At concentrations of more than about 60% $P_2O_5$, phase separation during solvent extraction becomes a major problem, regardless of how little crud is formed, and solvent extractions are seldom carried out at these high concentrations. Of course, if an acid with a solids content of less than about 0.5% is available, this clarification step can be omitted.

After clarification, the phosphoric acid is intimately mixed and thereby contacted with a liquid hydrocarbon which is essentially insoluble and immiscible in the phosphoric acid and which has a boiling point temperature higher than the temperature at which the process is carried out. Other than meeting the above criteria of insolubility, immiscibility, and boiling point temperature, the choise of a liquid hydrocarbon is not critical. Thus the liquid hydrocabon can be aromatic or aliphatic, saturated or unsaturated, chlorinated or nonchlorinated, or mixtures thereof. If the liquid hydrocarbon is aliphatic, it normally has a chain of at least 4 carbon atoms, preferably from about 5 to 18 carbon atoms. Illustratively, the process may be carried out at a temperature between about 60° and 200° F., preferably between about 100° and 140° F. Whatever the temperature, however, the boiling point temperature of the liquid hydrocarbon is above that temperature, as mentioned above.

The liquid hydrocarbon should be used in an amount effective to remove a substantial portion of the crud-forming agents from the phosphoric acid. The liquid hydrocarbon does not remove the valuable by-products such as uranium which remain in the phosphoric acid for subsequent removal by solvent extraction (Step 6). Illustratively, the ratio of the volume of liquid hydrocarbon to the volume of acid processed may be between about 0.1 and 10. It is preferred that the hydrocarbon-to-acid volumetric ratio be higher than about 0.2. Also, in the mixing operation aqueous phase continuity (i.e., dispersion of the hydrocarbon within the acid) is desirable and this may limit the preferred hydrocarbon-to-acid volumetric ratio to less than about 2.

Examples of suitable liquid hydrocarbons are kerosene, diesel fuel, light heating oils (e.g., numbers 1 and 2), naphtha, hexane, nonane, decane, dodecane, benzene, heptane, octane, toluene, the xylenes, and the like, and chlorinated liquid hydrocarbons such as chlorohexane, chloroheptane, chlorodecane, and the like, and mixtures thereof. Kerosene is particularly preferred.

After mixing with the liquid hydrocarbon as described above, the mixture of phosphoric acid and hydrocarbon is separated (Step 3 above). This separation step may be carried out in any conventional separation apparatus (e.g., in a settling tank). In a settling tank separation, the hydrocarbon component of the mixture, entraining or carrying with it the crud-forming agents in suspension, flows upward while the acid stays at the bottom. The phosphoric acid can then be conveniently separated by withdrawing the supernatant hydrocarbon-crud-forming agents mixture. When the separated phosphoric acid is subsequently subjected to solvent extraction, very little crud formation, if any, occurs. It is therefore thought that the materials which are responsible for the formation of the crud during the extraction of the acid are for the most part removed by the liquid hydrocarbon in the mixing and separation steps of this invention. This is consistent with the observed fact that a crud-like material which is made up primarily of siliceous compounds, iron and aluminum compounds, sulfates, carbonaceous matter and the other materials frequently associated with crud and mentioned above is removed from the acid by the mixing and separation steps described above. However, the foregoing explanation is offered as a possible explanation only, and it is not intended that the invention be limited to any particular operating mechanism.

Whatever the mechanism by which the crud-forming agents are removed by the liquid hydrocarbon in accordance with this invention, it will be understood that the crud-forming agents are not removed by the liquid hydrocarbon by way of extraction or dissolution of the crud-forming agents into the liquid hydrocarbon. It has been found that the crud-forming agents are for the most part incapable of being extracted or dissolved by the liquid hydrocarbon used in accordance with the principles of this invention. They are also incapable of being substantially extracted or dissolved by extracting agents, such as TOPO-D2EHPA-kerosene extractants, which are sometimes used as solvent extractants of either impurities or valuable by-products in the manufacture of wet process phosphoric acid, as already explained. It is precisely because they are incapable of being dissolved in these solvent extractants that these crud-forming agents tend to accumulate and form the stable mixture of solids, solvent and acid which is commonly called "crud". Crud, then, is the result of the coming together of material which is insoluble in the solvent extractants used in these solvent extraction processes, phosphoric acid, and the solvent extractant itself. It has been found that whatever material, whether organic or inorganic, impurity or by-product, humic or non-humic, is substantially dissolved by the solvent extractants used in the solvent extraction process that follows the pretreatment of this invention is not a crud-forming agent, as contemplated by the method of this invention. It has also been found that the crud-forming agents removed by the method of this invention do not go into solution in the liquid hydrocarbon used to remove them and, as opposed to materials that may go into solution in certain solvent extractants, it is generally possible to separate most of the liquid hydrocarbon from the crud-forming agents by a centrifugation operation if desired.

The mixing and separation steps described above may be carried out in any number of mixing-settling stages. However, in most cases, only one mixing-settling stage is needed to effectively treat the acid prior to the solvent extraction. This is an important advantage of the method of this invention since it avoids the necessity for the use of expensive multistage solids-liquid separation equipment.

The separated mixture of liquid hydrocarbon and crud-forming agents from the separation step (Step 3 above) may be sent directly to a regeneration step (Step 5 above) or it may optionally go through a washing step (Step 4 above) before being sent to the regeneration step. In the washing step, the mixture of liquid hydrocarbon and crud-forming agents is washed in one or more stages with a washing agent which is immiscible in the liquid hydrocarbon and which is effective to remove and recover any $P_2O_5$ values which may be entrained in the mixture of liquid hydrocarbon and crud-forming agents. Examples of suitable washing agents are water and aqueous acids such as aqueous $H_2SO_4$. The washing step serves to prevent phosphate precipitation and neutralization of any base used during regeneration of the liquid hydrocarbon as described above. It also serves to recover valuable $P_2O_5$ which may be sent back to other stages of the process. For example, if the washing step is conducted with water, the resulting dilute phosphoric acid stream may be conveniently sent to an evaporation stage of the wet process. If the washing step is conducted with aqueous $H_2SO_4$, the resulting phosphoric acid-sulfuric acid stream may be recycled to the attack system of the wet process. Whether a washing step is used at this point will, in general, depend on the economics of the process. Again, it is pointed out that this washing step is entirely optional to the practice of the method of this invention.

In Step 5, the liquid hydrocarbon is regenerated by contacting the mixture of hydrocarbon and crud-forming agents with an immiscible aqueous base which is effective to remove the crud-forming agents from the liquid hydrocarbon, and then separating the liquid hydrocarbon from the aqueous base and crud-forming agents. Examples of suitable aqueous bases for use in this step are $NH_4OH$, $NaOH$, $KOH$, $Na_2CO_3$, $K_2CO_3$, and the like. The regeneration step may be carried out in mixing-settling equipment of the same type used in the mixing and separation steps (Steps 2 and 3 above). Illustratively, from one to four, preferably one or two, mixing-settling stages may be used. The aqueous base should be used in an amount and strength which is effective to remove substantially all of the crud-formed agents from the liquid hydrocarbon. This is important to prevent an accumulation of the crud-forming agents in the recycled liquid hydrocarbon which could interfere with the process, for example, by retarding the separation of phases in Step 3. The ratio between the volume of aqueous base and the volume of the mixture of liquid hydrocarbon and crud-forming agents is typically at least about 0.3, preferably between about 0.5 and 2, and the strength of the aqueous base is typically between about 0.3 and 30, preferably between about 1 and 10, percent by weight. The mechanism of the regeneration of the liquid hydrocarbon does not appear to involve a chemical precipitation. Instead, the crud-forming agents appear to transfer from the hydrocarbon to the base, mostly in the form of suspended matter. The liquid hydrocarbon, being lighter, tends to flow upward and may be conveniently separated as the supernatant phase. Some precipitation of $P_2O_5$ values, which may be present in the mixture of liquid hydrocarbon and crud-forming agents, may occur in the regeneration step. If such precipitation occurs, the precipitate is generally in the form of insoluble phosphates which are removed from the system with the mixture of base and crud-forming agents. Of course, a washing step as described above, removes most $P_2O_5$ prior to the regeneration step and may be used to substantially avoid the precipitation of phosphates during the regeneration step.

The regenerated liquid hydrocarbon is recycled to the mixing step (Step 2) to contact clarified acid as previously described. Any loss of liquid hydrocarbon in the system may be compensated for by a make-up stream of the hydrocarbon as shown in FIG. 1.

Figure 2:
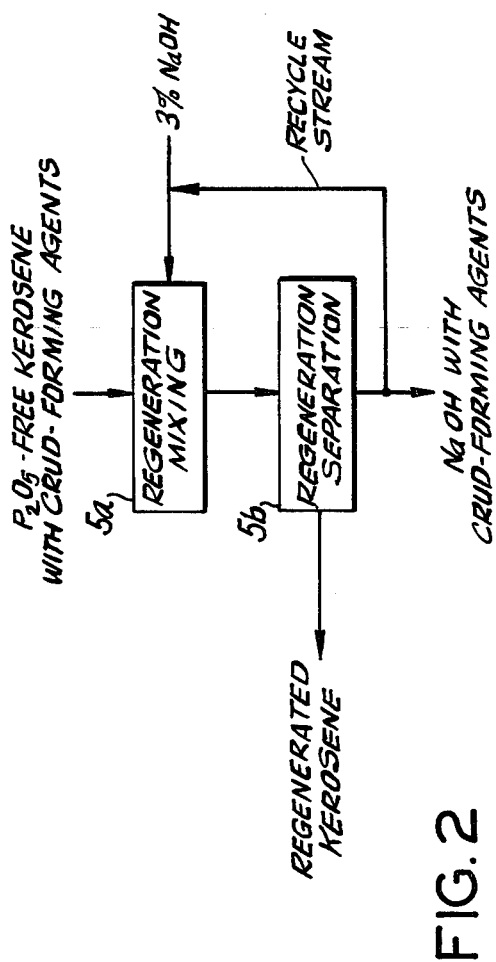
FIG. 2 is a block diagram showing one of the steps shown in FIG. 1 in somewhat greater detail.

FIG. 2 shows a preferred embodiment of the regeneration step described above. As mentioned above, the regeneration step typically includes a regeneration mixing step (Step 5a in FIG. 2) and a regeneration separation step (Step 5b in FIG. 2). In the embodiment shown in FIG. 2, the liquid hydrocarbon is assumed to be kerosene and the agent used in the regeneration step is aqueous NaOH. In the regeneration mixing step (Step 5a), essentially $P_2O_5$-free kerosene with crud-forming agents from a washing step (Step 4 in FIG. 1) is mixed with aqueous NaOH having a concentration of approximately 3% by weight. This aqueous NaOH is a combination of a recycle stream of aqueous NaOH with crud-forming agents from the regeneration separation step (Step 5b) and fresh 3% NaOH. It will be understood that when a recycle stream of NaOH is used as shown in FIG. 2, the volumetric ratios between the aqueous base and the mixture of liquid hydrocarbon with crud-forming agents mentioned above refer to the combined volume of fresh and recycled base. In the regeneration separation step (Step 5b) the kerosene and NaOH are separated, with substantially all of the crud-forming agents going with the NaOH. Part of the NaOH with crud-forming agents is recycled to the regeneration mixing step as described above and the remainder is removed from the system. It will be understood that under equilibrium conditions, the amount of crud-forming agents entering the regeneration mixing step with the kerosene is equal to the amount removed from the system with the non-recycled NaOH.

The following examples are intended to illustrate the underlying principles of the invention, but with no intention to be limited thereto.

EXAMPLE I

A pilot plant for solvent extraction of sulfate and fluorine from wet process phosphoric acid was operated without using the method of this invention for pretreating the acid. In the pilot plant a feed of wet process phosphoric acid having a concentration of about 38–40% $P_2O_5$ was mixed with and then separated from well-known organic solvents for sulfate and fluorine extraction. The separations were performed in settlers in the pilot plant apparatus. Crud filled the organic zones of 8 settlers in less than 6 hours of pilot plant operation (i.e., about one gallon of crud was produced for each gallon of acid processed).

The method of this invention was used to pretreat a similar phosphoric acid feed prior to solvent extraction in the pilot plant described above. A phosphoric acid feed of from about 0.5 to about 1.1 gallons per minute having strength from about 37.1 to about 40.0% $P_2O_5$, temperature from about 105° to about 146° F., and volumetric solids content from about 0.2 to about 1.6% was mixed with a liquid hydrocarbon stream of about 1.0 to about 1.4 gallons per minute in the mixer stage of a first mixer-settler. The liquid hydrocarbon used was a product sold by the Exxon Corporation under the tradename "Isopar L." This is an aliphatic, mostly saturated, clear liquid hydrocarbon having a boiling point in the range from about 370° to 403° F. The phosphoric acid was separated from the liquid hydrocarbon phase in the settler stage of the first mixer-settler and the phosphoric acid was passed to the solvent extraction apparatus of the pilot plant. It was observed that the liquid hydrocarbon did not change color, but rather remained a clear liquid, indicating that there was virtually no dissolution into the hydrocarbon of any color-imparting organic substances. The solvent extraction apparatus operated with little or no crud formation over the course of approximately 9 days. The liquid hydrocarbon from the above-mentioned separation containing the crud-forming agents in the form of a suspension, was washed with and then separated from a stream of approximately 25% aqueous $H_2SO_4$ having a rate of approximately 1 gallon per minute in a second mixer-settler. The washed liquid hydrocarbon still with the crud-forming agents in the form of a suspension, was then mixed with and separated from a stream of aqueous NaOH having strength varying from about 1.5 to about 6.6% NaOH and a rate from about 0.8 to about 1.7 gallons per minute in a third mixer-settler to regenerate a lean liquid hydrocarbon. The regenerated liquid hydrocarbon was returned to the first mixer-settler for mixing with more phosphoric acid.

EXAMPLE II

This example illustrates the effectiveness of various liquid hydrocarbons for removing crud-forming agents in accordance with the principles of this invention. Crud left in the settler stage of the second mixer-settler in the apparatus described in Example I at the end of approximately 9 days of operation was allowed to settle and compact for 18 days. Samples of this crud were then collected and drained for liquid hydrocarbon; and the drained crud was repeatedly washed with petroleum ether to remove additional liquid hydrocarbon and then dried under a heat lamp for about 11 hours. The removed hydrocarbon had substantially no crud-forming agents dissolved in it. The dried crud was mixed with water to form a slurry containing about 5.61% solids and 3.96% organic carbon. Acid samples for crud removal tests (referred to herein as test samples) were prepared by mixing one part of this slurry to 150 parts (by volume) of reagent grade phosphoric acid diluted to a 40% $P_2O_5$ concentration.

Standard samples were made by mixing the crud slurry with 40% $P_2O_5$ acid as described above and filtering a portion of this mixture through fine fritted glass. The filtrate was taken as the standard for 100% crud removal and the unfiltered acid was taken as a standard for no crud removal. These were blended to make intermediate standards. All the standard samples were read on a colorimeter and the readings plotted against the percent crud removal.

After standards had been prepared as described above, several different liquid hydrocarbons were mixed with 40% $P_2O_5$ test samples for 3 minutes in a batch mixer operating at 500 RPM. Temperatures were around 100° F. and the ratio of acid to liquid hydrocarbon was 1.0. The following liquid hydrocarbons were tested: "Isopar L" (mentioned above), "Solvesso 100" (a primarily aromatic liquid hydrocarbon available from the Exxon Corporation), heptane, benzene, "Nepoleum 470" (a primarily aliphatic liquid hydrocarbon available from the Kerr-McGee Corporation), and "Solvent SS25" (a chlorinated aliphatic liquid hydrocarbon available from the National Chemsearch Corporation). All of these liquid hydrocarbons were effective to achieve at least 70% crud removal, more typically 75 to 100% crud removal, under the conditions described above as determined by colorimeter comparison to the standard samples.

EXAMPLE III

This example illustrates the effectiveness of various hydrocarbon regenerating agents in removing crud from the liquid hydrocarbons. A sample of the washed crud from the second mixer-settler in the apparatus described in Example I was drained of excess liquid hydrocarbon. This was possible because the crud-forming material and the hydrocarbon formed a two-phase suspension. Samples of the drained crud were mixed with "Isopar L" and various regenerating agents in a magnetic stirrer for 15 minutes at a speed just fast enough to effectively comingle the phases. Each mixture was then allowed to settle and the fractions of separated aqueous phase, separated organic phase, unseparated dispersion or crud were measured at 5, 15, 30, and 120 minutes of settling time. Potassium hydroxide, sodium hydroxide, sodium carbonate, and ammonia were tested as regenerating agents at various concentrations. With 5 minutes of settling time or more, the fraction of unseparated dispersion or crud was reduced to less than 20% of the original mixture using aqueous potassium hydroxide at concentrations of from about 2 to 5% KOH. Aqueous sodium hydroxide yielded similar results under similar conditions at concentrations from about 2 to 4% NaOH. Aqueous sodium carbonate yielded similar results under similar conditions at concentrations from about 2 to 7% $Na_2CO_3$. Ammonia was most effective for short settling times at concentrations in the range from 1 to 6% $NH_3$.

EXAMPLE IV

This example serves to further identify some of the materials which may act as crud-forming agents. A pilot plant was operated for extraction of uranium from nominal 30% $P_2O_5$ phosphoric acid using a well known solvent made up of di (2-ethylhexyl) phosphoric acid and trioctylphosphine oxide (D2EHPA- TOPO) in a kerosene-like diluent sold by Kerr-McGee Corporation under the name of "Kermac 470-B." The phosphoric acid was produced from uncalcined rock by the wet process and was subjected to various pretreatments prior to solvent extraction. The crud which formed in the extraction equipment was sampled for analysis, but prior to analysis the samples were treated for removal of solvent and acid by one of the methods described below. It should be emphasized that this crud was not soluble in the di (2-ethylhexyl) phosphoric acid-trioctylphosphine oxide solvent mixture but existed as a separate mass which contained both acid and solvent and which had a loosely clotted consistency somewhat similar to curd formed in milk. The procedures by which the samples were washed were as follows:

1. Alcohol Wash:

Crud samples from the pilot plant extraction equipment were drained of excess solvent and centrifuged to further remove excess solvent and acid which were discarded. The centrifuged crud was mixed with alcohol (methanol or ethanol) and recentrifuged. Crud solids collected at the bottom of the centrifuge tube. The alcohol fraction containing acid and solvent was discarded. The solids were rewashed, dried and submitted for chemical analysis.

2. Petroleum Ether/Water Wash:

Crud samples from the pilot plant were drained of excess solvent and centrifuged for removal of additional excess solvent and excess acid. The centrifuged crud (usually 20–50 ml by volume) was placed in a tall 400 ml beaker along with a magnetic spin bar. Distilled water was added to bring the level in the beaker to about 100 mls and the contents were mixed on a magnetic stirrer. Next, about 100 mls of petroleum ether was mixed with the contents of the beaker. The resulting mass, resembling a thick crud, was centrifuged. Aqueous and organic fractions containing acid and solvent respectively were discarded and the compacted mass of crud was retained. This material was rewashed with petroleum ether and water in the manner described above until it had been successively washed a total of 5 times.

The final crud mass was dried and submitted for analysis.

Those skilled in the art will understand that both washing procedures probably cause part of the sample to be lost by dissolution in the wash liquids. With the petroleum ether/water wash procedure some of the inorganic constituents are dissolved by the water, whereas, with the alcohol wash procedure organic matter is partially dissolved by the alcohol.

Chemical analysis of the washed crud samples are given in Table I, below. All data are weight percent.

TABLE I

| Crud Sample | A | A | B | B | C | D | E | E | F | G | H |
| --- | --- | --- | --- | --- | --- | --- | --- | --- | --- | --- | --- |
| Wash Method | M | PE/W | M | PE/W | M | M | E | PE/W | M | M | M |
| Phosphate as $P_2O_5$ | 4.68 | 11.54 | 6.29 | 8.35 | 5.22 | 0.67 | 2.02 | 4.92 | 0.44 | 2.89 | 2.57 |
| Iron as $Fe_2O_3$ | 0.56 | 1.49 | 2.37 | 1.77 | 36.53 | 0.06 | 0.39 | 0.49 | 7.83 | 5.94 | 8.16 |
| Aluminum as $Al_2O_3$ | 0.43 | 0.45 | 0.27 | 0.13 | 0.30 | 0.38 | 0.81 | 0.03 | 2.77 | 1.77 | 2.85 |
| Sulfate as $SO_4$ | 24.24 | 0.52 | 21.64 | 9.31 | N.D. | 21.03 | 25.80 | 17.26 | 0.86 | 26.27 | 0.02 |
| Fluoride as F | 15.12 | 0.12 | 1.76 | 0.10 | 0.32 | 36.78 | 29.05 | 2.39 | 10.07 | 4.86 | 3.40 |
| Silicon as $SiO_2$ | 12.44 | 3.73 | 31.73 | 31.12 | 4.96 | 9.17 | 6.60 | 3.39 | 31.47 | 12.36 | 33.33 |
| Potassium as $K_2O$ | 1.69 | 0.05 | 0.41 | 0.12 | 0.03 | 1.61 | 0.75 | 0.03 | 0.31 | 1.59 | 0.39 |
| Sodium as $Na_2O$ | 9.19 | 0.12 | 0.68 | 0.02 | 5.09 | 33.60 | 27.10 | 0.94 | 3.54 | 0.42 | 0.19 |
| Calcium as CaO | 15.75 | 0.70 | N.A. | 5.66 | 5.90 | 12.89 | 15.97 | 10.74 | 5.29 | 17.00 | 0.31 |
| Magnesium as MgO | 0.11 | 0.22 | 0.77 | 0.02 | 6.01 | 0.02 | 0.23 | 0.01 | 0.29 | 0.40 | 1.36 |
| Organic Carbon as C | N.A. | 48.79 | N.A. | 25.29 | N.A. | N.A. | N.A. | N.A. | 25.91 | 13.03 | 23.67 |

N.A. = Not Analyzed
M = Methanol
PE/W = Petroleum Ether/Water
N.D. = None Detected
E = Ethanol

EXAMPLE V

This example illustrates the formation of crud by a purely inorganic agent, and also illustrates the effectiveness of the invention in removing and eliminating this crud-forming agent. A sample of 30% $P_2O_5$ phosphoric acid was prepared by dilution of reagent grade phosphoric with distilled water. To 150 mls of this diluted acid was added 1.0 grams of finely divided clay, sold under the trade name "Impact 100 RR" by Morton Chemical Company. Next, 150 mls of fresh, unused solvent containing 0.5 molar di (2-ethylhexyl) phosphoric acid and 0.125 molar trioctylphosphine oxide in "Kermac 470-B" was added to the beaker containing the phosphoric acid and clay suspension. The contents of this beaker were mixed 5 minutes on a magnetic stirrer and then settled. A reddish-tan crud was observed along the interface.

An additional 150 mls of the 30% reagent grade acid containing 1.0 gram of clay was mixed with 150 mls of a clear aromatic hydrocarbon sold by the Exxon Corporation under the trade name "Solvesso 150." The acid was recovered with a separatory funnel and then mixed 5 minutes with 150 mls of the fresh, unused solvent as described above. Essentially, no crud formation was observed with the treated acid.

The collected hydrocarbon containing the clay solids was drained from the separatory funnel into a beaker. The hydrocarbon remained clear. The clayey mass, being heavier, remained along the bottom of the beaker. 100 mls of clear hydrocarbon were then removed by pipette and discarded. The remaining 50 mls, still containing the clayey mass, were mixed for 2–3 minutes with 50 mls of 1% NaOH. After settling, the hydrocarbon was completely clean and essentially all the clay was present as a suspension in the 1% NaOH solution. The solids in this suspension gradually settled to the bottom of the beaker clearly indicating that all transfers were made with the clay particles in the solid state.

What is claimed is:

1. A method of treating wet-process phosphoric acid to remove crud-forming agents, prior to treating the phosphoric acid with an organic extraction solvent, comprising the steps of:
   (a) mixing the phosphoric acid with a liquid consisting of a hydrocarbon, the volume ratio of liquid hydrocarbon to phosphoric acid being in the range of from about 0.1 to 10, to remove a substantial portion of the crud-forming agents from the phosphoric acid by entraining the crud-forming agents in the liquid hydrocarbon but without dissolving at least the major portion of the removed crud-forming agents in the liquid hydrocarbon; the liquid hydrocarbon being essentially insoluble and immiscible in the phosphoric acid and having a boiling point above the temperature at which the steps of said method are carried out;
   (b) separating the liquid hydrocarbon, containing entrained crud-forming agents, from the phosphoric acid;
   (c) mixing the liquid hydrocarbon with an aqueous base in an amount and concentration effective to transfer substantially all of the crud-forming agents mostly in the form of suspended matter from the liquid hydrocarbon to the aqueous base; the volume of aqueous base to the volume of the mixture of liquid hydrocarbon and crud-forming agents being at least about 0.3; and then
   (d) separating the aqueous base from the liquid hydrocarbon to regenerate the liquid hydrocarbon for reuse in mixing with phosphoric acid.

2. The method defined in claim 1 wherein the wet-process phosphoric acid is treated with an organic extraction solvent comprising di(2-ethylhexyl)phosphoric acid and trioctylphosphine oxide after being separated from the liquid hydrocarbon in step b).

3. The method defined in claim 1 wherein, in step a), said liquid hydrocarbon is selected from the group consisting of kerosene, diesel fuel, number 1 heating oil, number 2 heating oil, naphtha, hexane, nonane, decane, dodecane, benzene, heptane, chlorodecane, and mixtures thereof.

4. The method defined in claim 1 wherein, in step a), said liquid hydrocarbon is kerosene.

5. The method defined in claim 1 wherein, in step a), the volume ratio of liquid hydrocarbon to phosphoric acid is in the range of from about 0.2 to 2.

6. The method defined in claim 1 wherein, in step c), said aqueous base is selected from the group consisting of $NH_4OH$, $NaOH$, $KOH$, $Na_2CO_3$, and $K_2CO_3$.

7. The method defined in claim 1 wherein, in step c), the volume ratio of aqueous base to liquid hydrocarbon, containing crud-forming agents, is at least about 0.3 and wherein the strength of the aqueous base is in the range of from about 0.3 to 30 percent by weight.

8. The method defined in claim 1 wherein, in step c), the volume ratio of aqueous base to liquid hydrocarbon, containing crud-forming agents, is in the range of from about 0.5 to 2 and wherein the strength of the aqueous base is in the range of from about 1 to 10 percent by weight.

9. The method defined in claim 1 further comprising the step of clarifying the phosphoric acid to a solids content of less than about 0.5 percent by volume prior to mixing the phosphoric acid with the liquid hydrocarbon in step a).

10. The method defined in claim 1 further comprising the step of clarifying the phosphoric acid to a solids content of less than about 0.3 percent by volume prior to mixing the phosphoric acid with the liquid hydrocarbon in step a).

11. A method of treating wet-process phosphoric acid to remove crud-forming agents, prior to treating the phosphoric acid with an organic extraction solvent, comprising the steps of:
   (a) mixing the phosphoric acid with a liquid consisting essentially of a hydrocarbon, the volume ratio of liquid hydrocarbon to phosphoric acid being in the range of from about 0.1 to 10, to remove a substantial portion of the crud-forming agents from the phosphoric acid by entraining the crud-forming agents in the liquid hydrocarbon but without dissolving at least the major portion of the removed crud-forming agents in the liquid hydrocarbon; the liquid hydrocarbon being essentially insoluble and immiscible in the phosphoric acid and having a boiling point above the temperature at which the steps of said method are carried out;
   (b) separating the liquid hydrocarbon, containing entrained crud-forming agents, from the phosphoric acid;
   (c) washing the liquid hydrocarbon with an immiscible liquid washing agent selected from the group consisting of water and aqueous acid to recover additional phosphoric acid entrained in the liquid hydrocarbon;
   (d) mixing the liquid hydrocarbon with an aqueous base in an amount and concentration effective to transfer substantially all of the crud-forming agents from the liquid hydrocarbon to the aqueous base; and then (e) separating the aqueous base from the liquid hydrocarbon to regenerate the liquid hydrocarbon for reuse in mixing with phosphoric acid.

12. The method defined in claim 11 wherein, in step a), said liquid hydrocarbon is selected from the group consisting of kerosene, diesel fuel, number 1 heating oil, number 2 heating oil, naphtha, hexane, nonane, decane, dodecane, benzene, heptane, octane, toluene, the xylenes, chlorohexane, chloroheptane, chlorodecane, and mixtures thereof.

13. The method defined in claim 11 wherein, in step a), said liquid hydrocarbon is kerosene.

14. The method defined in claim 11 wherein, in step a), the volume ratio of liquid hydrocarbon to phosphoric acid is in the range of from about 0.2 to 2.

15. The method defined in claim 11 wherein, in step d), said aqueous base is selected from the group consisting of $NH_4OH$, $NaOH$, $KOH$, $Na_2CO_3$, and $K_2CO_3$.

16. The method defined in claim 11 wherein, in step d), the volume ratio of aqueous base to liquid hydrocarbon, containing crud-forming agents, is at least about 0.3 and wherein the strength of the aqueous base is in the range of from about 0.3 to 30 percent by weight.

17. The method defined in claim 11 wherein, in the step d), the volume ratio of aqueous base to liquid hydrocarbon, containing crud-forming agents, is in the range of from about 0.5 to 2 and wherein the strength of the aqueous base is in the range of from about 1 to 10 percent by weight.

18. The method defined in claim 11 further comprising the step of clarifying the phosphoric acid to a solids content of less than about 0.5 percent by volume prior to mixing the phosphoric acid with the liquid hydrocarbon in step a).

19. The method defined in claim 11 further comprising the step of clarifying the phosphoric acid to a solids content of less than about 0.3 percent by volume prior to mixing the phosphoric acid with the liquid hydrocarbon in step a).

20. The method defined in claim 11 wherein said washing agent is aqueous $H_2SO_4$.

21. The method defined in claim 11 wherein the wet-process phosphoric acid is treated with an organic extraction solvent comprising di(2-ethylhexyl)phosphoric acid and trioctylphosphine oxide after being separated from the liquid hydrocarbon in step b).

* * * * *